United States Patent
Chang et al.

(10) Patent No.: US 10,477,615 B2
(45) Date of Patent: Nov. 12, 2019

(54) METHODS FOR HANDLING A PDN DISCONNECTION REQUEST AND COMMUNICATIONS APPARATUS UTILIZING THE SAME

(71) Applicant: MediaTek Inc., Hsin-Chu (TW)

(72) Inventors: Chia-Wei Chang, Taipei (TW); Zong-Syun Lin, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 145 days.

(21) Appl. No.: 14/992,150

(22) Filed: Jan. 11, 2016

(65) Prior Publication Data
US 2016/0212795 A1 Jul. 21, 2016

Related U.S. Application Data

(60) Provisional application No. 62/104,228, filed on Jan. 16, 2015.

(51) Int. Cl.
| | |
|---|---|
| *H04W 76/06* | (2009.01) |
| *H04W 60/06* | (2009.01) |
| *H04W 76/32* | (2018.01) |
| *H04W 76/34* | (2018.01) |

(52) U.S. Cl.
CPC ............ *H04W 76/32* (2018.02); *H04W 76/34* (2018.02)

(58) Field of Classification Search
CPC .......................... H04W 76/062; H04W 76/064
See application file for complete search history.

(56) References Cited

U.S. PATENT DOCUMENTS

| | | | |
|---|---|---|---|
| 2012/0327758 A1 | 12/2012 | Hu | |
| 2013/0242754 A1 | 9/2013 | Shaikh et al. | |
| 2014/0241264 A1* | 8/2014 | Liu | H04W 76/062 370/329 |
| 2015/0334622 A1* | 11/2015 | Baboescu | H04W 36/14 370/331 |

(Continued)

FOREIGN PATENT DOCUMENTS

| | | |
|---|---|---|
| CN | 101902732 | 12/2010 |
| CN | 101998331 A | 3/2011 |
| CN | 102202417 | 9/2011 |

(Continued)

OTHER PUBLICATIONS

"3rd Generation Partnership Project; Technical Specification Group Core Network and Terminals; Non-Access-Stratum (NAS) protocol for Evolved Packet System (EPS); Stage 3 (Release 13);" Dec. 2014; pp. 1-110.

*Primary Examiner* — Luat Phung
(74) *Attorney, Agent, or Firm* — McClure, Qualey & Rodack, LLP

(57) ABSTRACT

A method for handling a PDN disconnection request performed by a communications apparatus communicating with a network device includes transmitting a PDN disconnect request message to the network device to request to disconnect a predetermined PDN connection; receiving a PDN disconnect reject message from the network device; obtaining a reject cause carried in the PDN disconnect reject message; and locally deactivating all other PDN connection(s) other than the predetermined PDN connection when the reject cause carried in the PDN disconnect reject message indicates that the last PDN disconnection is not allowed.

18 Claims, 12 Drawing Sheets

(56) References Cited

U.S. PATENT DOCUMENTS

2016/0183156 A1* 6/2016 Chin ................. H04W 36/0022
370/331
2017/0195822 A1* 7/2017 Watfa .................... H04W 4/005

FOREIGN PATENT DOCUMENTS

| CN | 102413562 A | 4/2012 |
| CN | 103155639 A | 6/2013 |
| WO | 2012/041131 A1 | 4/2012 |
| WO | WO 2014/130412 | 8/2014 |

* cited by examiner

METHODS FOR HANDLING A PDN DISCONNECTION REQUEST AND COMMUNICATIONS APPARATUS UTILIZING THE SAME

CROSS REFERENCE TO RELATED APPLICATIONS

This application claims the benefit of U.S. Provisional Application No. 62/104,228 filed 2015 Jan. 16 and entitled "Deactivate bearers for last PDN disconnect reject", the entire contents of which are hereby incorporated by reference.

BACKGROUND OF THE INVENTION

Field of the Invention

The invention relates to methods for handling a PDN disconnection request when the PDN connection is the last PDN connection.

Description of the Related Art

The term "wireless" normally refers to an electrical or electronic operation, which is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network. The Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements.

In order to provide more efficient communications services, methods for efficient wireless communications are provided.

BRIEF SUMMARY OF THE INVENTION

Methods for handling a PDN disconnection request and communications apparatuses are provided. An exemplary embodiment of a communications apparatus comprises a radio transceiver and a processor. The radio transceiver transmits or receives wireless radio frequency signals to communicate with a network device. The processor transmits a PDN disconnect request message to the network device via the radio transceiver to request to disconnect a predetermined PDN connection, receives a PDN disconnect reject message from the network device via the radio transceiver and obtains a reject cause carried in the PDN disconnect reject message. When the reject cause carried in the PDN disconnect reject message indicates that the last PDN disconnection is not allowed, the processor locally deactivates all other PDN connection(s) other than the predetermined PDN connection.

An exemplary embodiment of a method for handling a PDN disconnection request, performed by a communications device communicating with a network device, comprises: transmitting a PDN disconnect request message to the network device to request to disconnect a predetermined PDN connection; receiving a PDN disconnect reject message from the network device; obtaining a reject cause carried in the PDN disconnect reject message; and locally deactivating all other PDN connection(s) other than the predetermined PDN connection when the reject cause carried in the PDN disconnect reject message indicates that the last PDN disconnection is not allowed.

Another exemplary embodiment of a communications apparatus comprises a radio transceiver and a processor. The radio transceiver transmits or receives wireless radio frequency signals to communicate with a network device. The processor receives a disconnection request to disconnect a predetermined PDN connection and determines whether the predetermined PDN connection is the last PDN connection. When the predetermined PDN connection is the last PDN connection, the processor ignores the disconnection request and does not transmit a PDN disconnect request message to the network device in response to the disconnection request.

Another exemplary embodiment of a method for handling a PDN disconnection request, performed by a communications device communicating with a network device, comprises: receiving a disconnection request to disconnect a predetermined PDN connection; determining whether the predetermined PDN connection is the last PDN connection; and ignoring the disconnection request and not transmitting a PDN disconnect request message to the network device in response to the disconnection request when the predetermined PDN connection is the last PDN connection.

Another exemplary embodiment of a communications apparatus comprises a radio transceiver and a processor. The radio transceiver transmits or receives wireless radio frequency signals to communicate with a network device. The processor transmits a PDN disconnect request message to the network device via the radio transceiver to request to disconnect a predetermined PDN connection, receives a PDN disconnect reject message from the network device via the radio transceiver and obtaining a reject cause carried in the PDN disconnect reject message. When the reject cause carried in the PDN disconnect reject message indicates that the last PDN disconnection is not allowed, the processor transmits one or more PDN connectivity request message(s) to the network device to recover one or more lost PDN connection(s) which is/are maintained locally by the processor other than the predetermined PDN connection.

Another exemplary embodiment of a method for handling a PDN disconnection request, performed by a communications device communicating with a network device, comprises: transmitting a PDN disconnect request message to the network device to request to disconnect a predetermined PDN connection; receiving a PDN disconnect reject message from the network device; obtaining a reject cause carried in the PDN disconnect reject message which indicates that the last PDN disconnection is not allowed; and transmitting one or more PDN connectivity request message(s) to the network device to recover one or more lost PDN connection(s) which is/are maintained locally by the communications device other than the predetermined PDN connection.

Another exemplary embodiment of a communications apparatus comprises a radio transceiver and a processor. The radio transceiver transmits or receives wireless radio frequency signals to communicate with a network device. The processor receives a disconnection request to disconnect a predetermined PDN connection. When the predetermined PDN connection is the last PDN connection, the processor transmits a PDN disconnect request message to the network device via the radio transceiver in response to the disconnection request to request to disconnect the predetermined PDN connection.

Another exemplary embodiment of a method for handling a PDN disconnection request, performed by a communications device communicating with a network device, comprises: receiving a disconnection request to disconnect a predetermined PDN connection; determining whether the predetermined PDN connection is the last PDN connection; and transmitting a PDN disconnect request message to the network device in response to the disconnection request to request to disconnect the predetermined PDN connection when the predetermined PDN connection is the last PDN connection.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
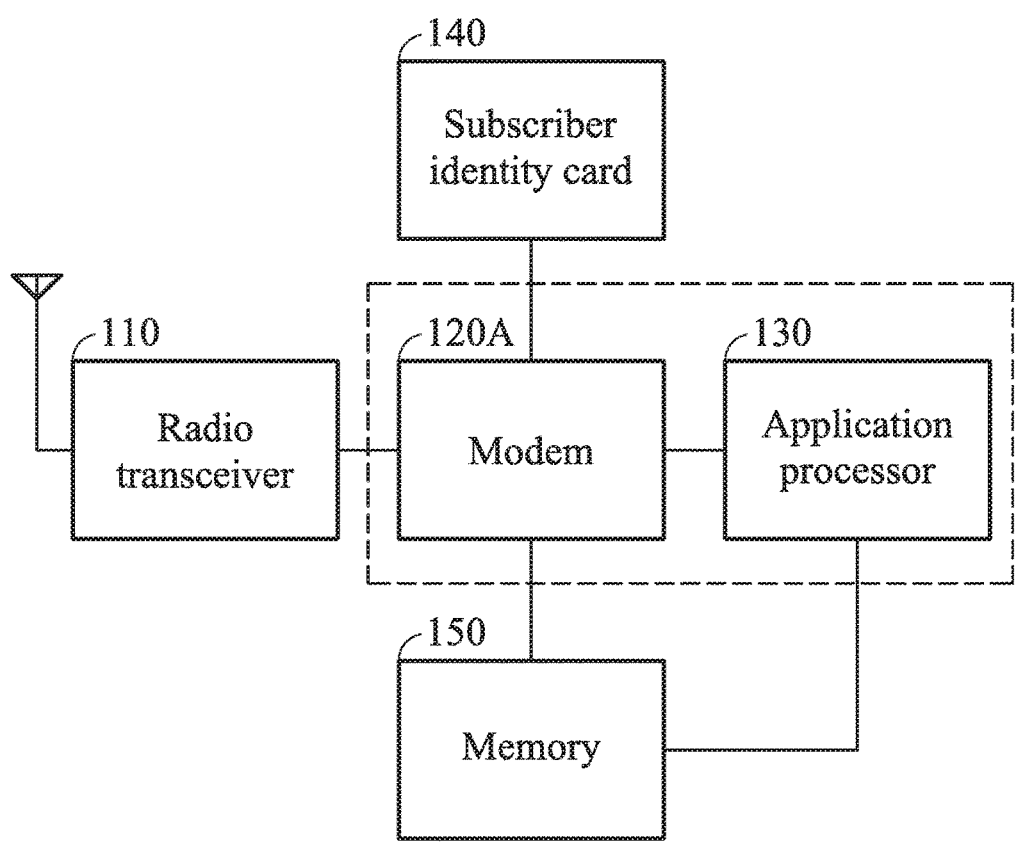
FIG. 1A shows an exemplary block diagram of a communications apparatus according to an embodiment of the invention.

FIG. 1A shows an exemplary block diagram of a communications apparatus according to an embodiment of the invention. The communications apparatus 100A may be a portable electronic device, such as a Mobile Station (MS, which may be interchangeably referred to as User Equipment (UE)). The communications apparatus 100A may comprise at least an antenna module comprising at least one antenna, a radio transceiver 110, a modem 120A, an application processor 130, a subscriber identity card 140, and a memory 150. The radio transceiver 110 may receive wireless radio frequency signals via the antenna module, transmit wireless radio frequency signals via the antenna module and perform RF signal processing. For example, the radio transceiver 110 may convert the received signals to intermediate frequency (IF) or baseband signals to be processed, or receive the IF or baseband signals from the modem 120A and convert the received signals to wireless radio frequency signals to be transmitted to a network device. According to an embodiment of the invention, the network device may be a cell, an evolved node B, a base station, a Mobility Management Entity (MME) etc., at the network side and communicating with the communications apparatus 100A via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portion in the RF signals and/or a mixer for performing radio frequency conversion. According to an embodiment of the invention, the radio frequency may be, for example, 900 MHz or 1800 MHz for a Global System for Mobile communication (GSM), or 1900 MHz for a Universal Mobile Telecommunications System (UMTS), or the frequency of any specific frequency band for a Long-Term Evolution (LTE) system, etc.

The modem 120A may be a cellular communications modem configured for handling cellular system communications protocol operations and processing the IF or baseband signals received from or to be transmitted to the radio transceiver 110. The application processor 130 is configured for running the operating system of the communications apparatus 100A and running application programs installed in the communications apparatus 100A. In the embodiments of the invention, the modem 120A and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory 150 may be coupled to the modem 120A and application processor 130 and may store system data or user data.

FIG. 1A shows a single-card single-standby application. With advancements in communications techniques, communications apparatuses are now capable of supporting multi-card multi-standby application and handling multi-RAT (radio access technology) operations, such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or the like via one communications apparatus.

Figure 1B:
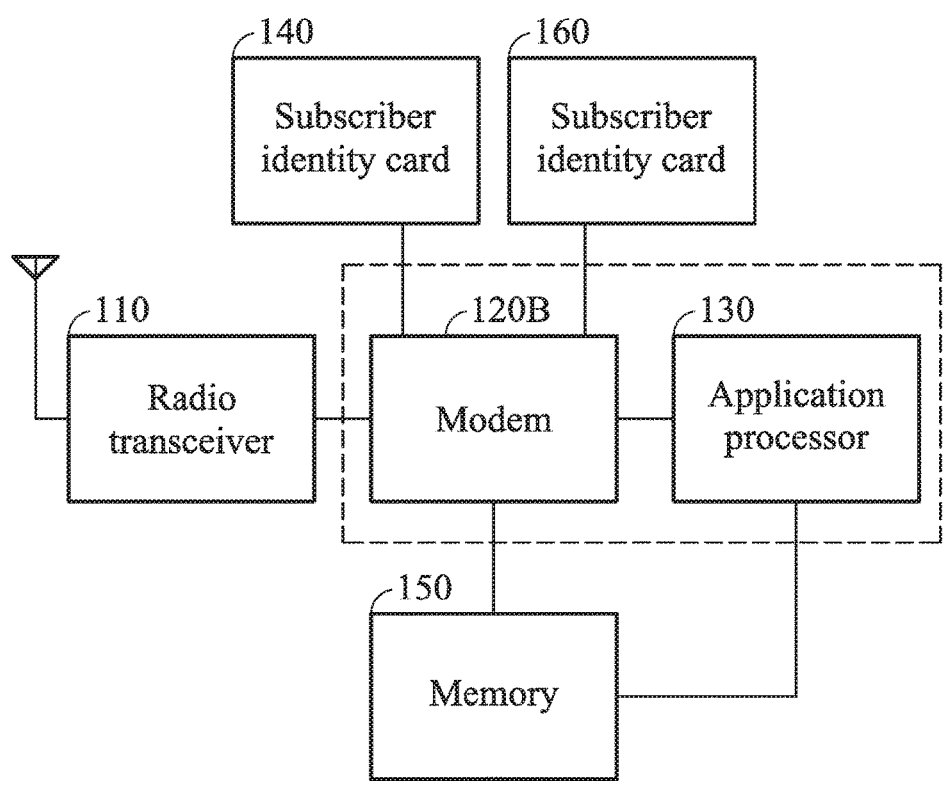
FIG. 1B shows an exemplary block diagram of a communications apparatus according to another embodiment of the invention.

FIG. 1B shows an exemplary block diagram of a communications apparatus according to another embodiment of the invention. Most of the elements shown in FIG. 1B are similar to FIG. 1A, and thus the descriptions are omitted here for brevity. In this embodiment, the communications apparatus 100B may comprise multiple subscriber identity cards 140 and 160 coupled to the modem 120B, thereby the modem 120B may at least support two RATs communications, wherein the two RATs may be different RATs or the same RAT, and the invention should not be limited to either case.

According to an embodiment of the invention, the modem 120B, the radio transceiver 110 and/or the antenna module may be shared by subscriber identity cards 140 and 160 to support at least two RATs communications. Therefore, in this embodiment, the communications apparatus 100B may be regarded as comprising at least two communications units, one may at least comprise the subscriber identity card 140, (all or part of) the modem 120B, the radio transceiver 110 and the antenna module, and another one may at least comprise the subscriber identity card 160, (all or part of) the modem 120B, the radio transceiver 110 and the antenna module.

According to an embodiment of the invention, the modem 120B may have the capability of handling the operations of multiple cellular system communications protocols and processing the IF or baseband signals for the corresponding communications units. Each communications unit may operate independently at the same time in compliance with a corresponding communications protocol, and thereby the communications apparatus 100B can support a multi-card multi-standby application.

Note that, in order to clarify the concept of the invention, FIG. 1A and FIG. 1B present simplified block diagrams in which only the elements relevant to the invention are shown. For example, in some embodiments of the invention, the communications apparatus may further comprise some peripheral devices not shown in FIG. 1A and FIG. 1B. In another example, in some embodiments of the invention, the communications apparatus may further comprise a central controller coupled to the modem 120A/120B and the application processor 130. Therefore, the invention should not be limited to what is shown in FIG. 1A and FIG. 1B.

Note further that subscriber identity cards 140 and 160 may be dedicated hardware cards as described above, or in some embodiments of the invention, there may be individual identifiers, numbers, addresses, or the like which are burned in the internal memory device of the corresponding modem and are capable of identifying the individual communications entity that the corresponding communications unit operates. Therefore, the invention should not be limited to what is shown in the figures.

Note further that although communications apparatuses 100B shown in FIG. 1B support two RAT wireless communications services, the invention should not be limited thereto. Those who are skilled in this technology can still make various alterations and modifications based on the descriptions given above to derive the communications apparatuses capable of supporting more than two RAT wireless communications without departing from the scope and spirit of this invention.

Note further that, although in FIG. 1B, the radio transceiver 110 and the antenna module are shared by multiple communications units, the invention should not be limited thereto. Those who are skilled in this technology can still make various alterations and modifications based on the descriptions given above to derive the communications apparatuses comprising multiple radio transceivers and/or multiple antenna modules for supporting multiple RAT wireless communications without departing from the scope and spirit of this invention.

Figure 2:
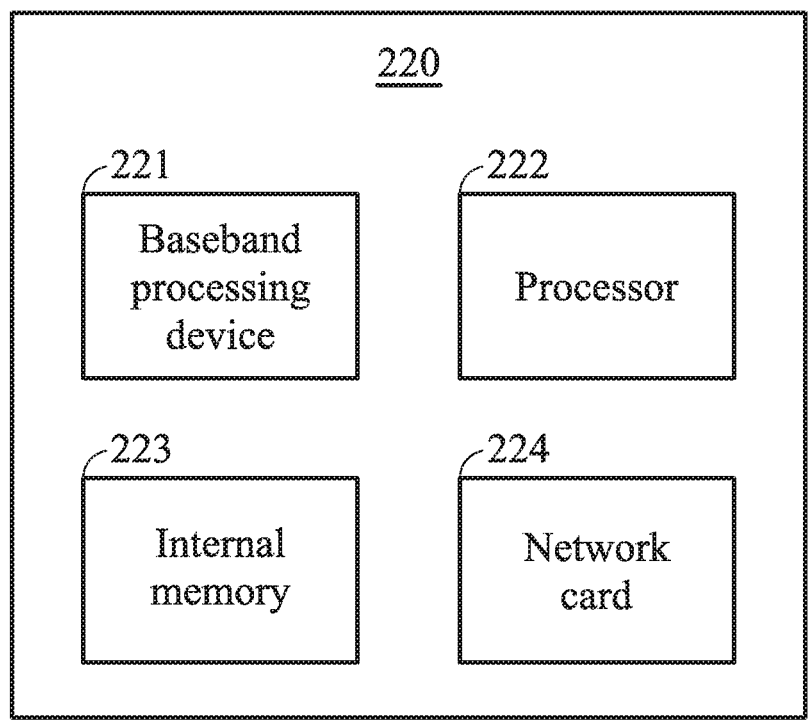
FIG. 2 shows an exemplary block diagram of a modem according to an embodiment of the invention.

FIG. 2 shows an exemplary block diagram of a modem according to an embodiment of the invention. The modem 220 may be the modem 120A or 120B shown in FIG. 1A and FIG. 1B and may comprise at least a baseband processing device 221, a processor 222, an internal memory 223 and a network card 224. The baseband processing device 221 may receive the IF or baseband signals from the radio transceiver 110 and perform IF or baseband signal processing. For example, the baseband processing device 221 may convert the IF or baseband signals to a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, a encoder for signal encoding, a decoder for signal decoding, and so on.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140 and/or 160, and write data to the subscriber identity card. The internal memory 223 may store system data and user data for the modem 220. The processor 222 may also access the internal memory 223.

The network card 224 provides Internet access services for the communications apparatus. Note that although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. Therefore, the invention should not be limited to any specific implementation method.

Note further that, in order to clarify the concept of the invention, FIG. 2 presents simplified block diagrams in which only the elements relevant to the invention are shown. Therefore, the invention should not be limited to what is shown in FIG. 2.

Note further that in some embodiments of the invention, the modem may comprise more than one processor and/or more than one baseband processing device. For example, the modem may comprise multiple processors and/or multiple baseband processing devices for supporting multi-RAT operations. Therefore, the invention should not be limited to what is shown in FIG. 2.

Figure 3A:
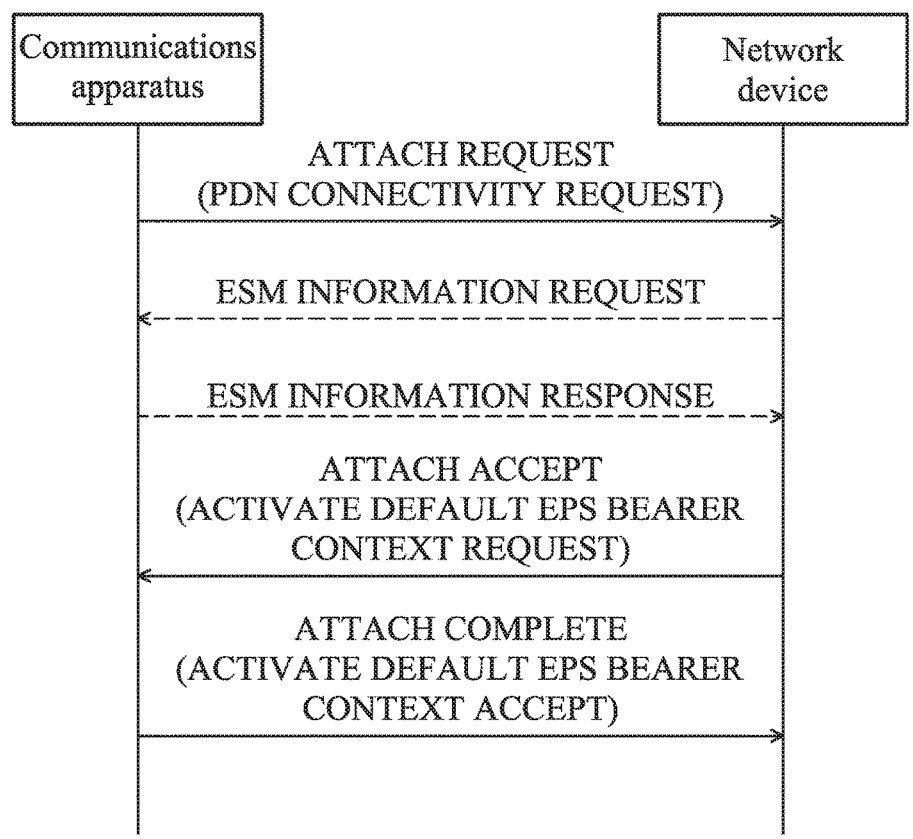
FIG. 3A is a message flow showing an LTE attach procedure.

FIG. 3A is a message flow showing an LTE attach procedure. The communications apparatus (e.g. the communications apparatus 100A or 100B) may transmit an attach request message with a Packet Data Network (PDN) connectivity request to the network device when entering the LTE network. The network device may transmit an attach accept message with an activate default Evolved Packet System (EPS) bearer context request in response to the attach request. Upon receiving the attach accept message and the activate default EPS bearer context request, the communications apparatus may transmit an attach complete message with an activate default EPS bearer context accept to the network device to complete the attach procedure. After the attach procedure, a PDN connection is established (or, activated), and the default EPS bearer associated with the PDN connection is also established (or, activated). Note that the EPS Session Management (ESM) information procedure takes place when the communications apparatus has security information that does not wish to reveal directly in attach request.

According to the 3GPP standards, the communications apparatus should keep at least one PDN connection being activated when staying in the LTE network. In addition, the communications apparatus may further establish one or more other additional PDN connections, such as an Internet PDN, an IP Multimedia Subsystem (IMS) PDN, when the corresponding communications request is required.

Figure 3B:
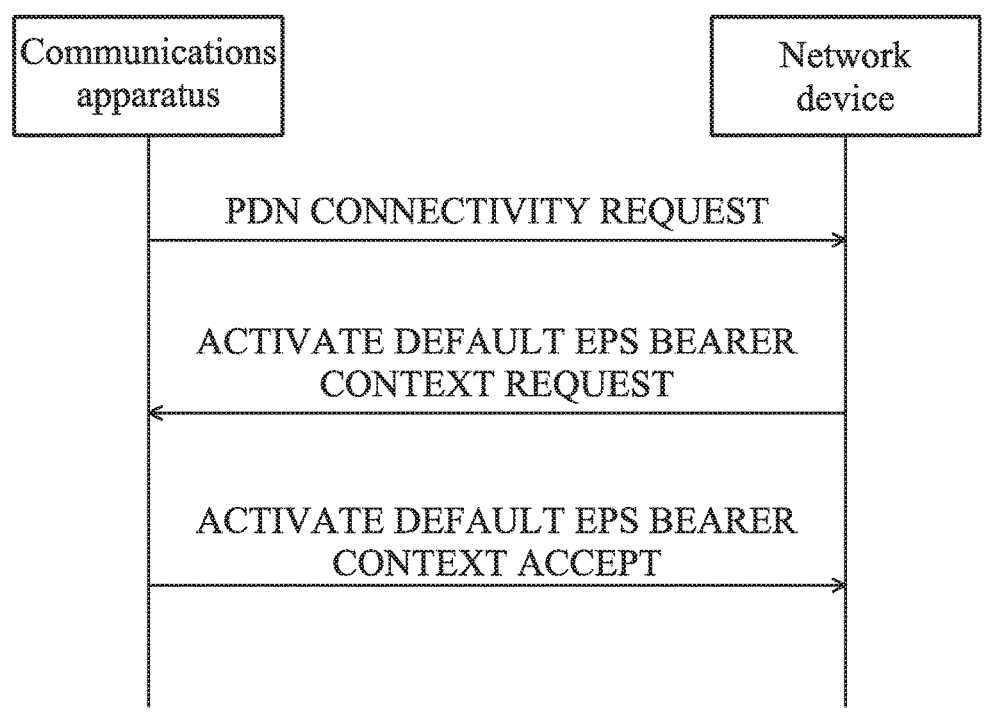
FIG. 3B is a message flow showing a PDN connectivity procedure to establish a PDN connection with the network device.

FIG. 3B is a message flow showing a PDN connectivity procedure to establish (or, activate) a PDN connection with the network device. The communications apparatus transmits a PDN connectivity request message to the network device. The network device transmits an activate default EPS bearer context request message in response to the PDN connectivity request message. Upon receiving the activate default EPS bearer context request message, the communications apparatus may transmit an activate default EPS bearer context accept message to the network device to complete the PDN connectivity procedure.

Figure 4:
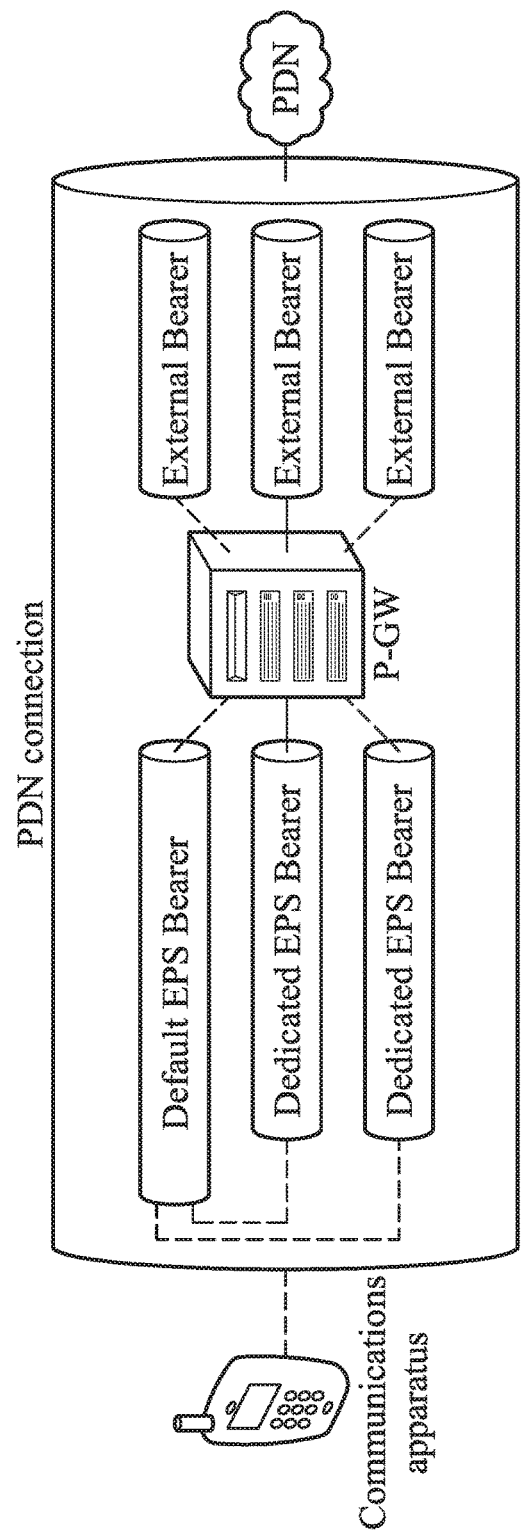
FIG. 4 is a schematic diagram showing the EPS bearers associated with a PDN connection.

FIG. 4 is a schematic diagram showing the EPS bearers associated with a PDN connection. A bearer carries data (traffic flow) from one network device to another, with a particular Quality of Service (QoS). An EPS bearer carries data (traffic flow) between the communications apparatus and a network device (e.g. the P-GW (PDN Gateway) as shown) under a specific QoS policy within a PDN connection. An EPS bearer is either a default or dedicated EPS bearer. The default EPS bearer is activated when the communications apparatus establishes a PDN connection. The dedicated EPS bearer is an additional EPS bearer resource which links to a default EPS bearer. A PDN may associate with one default EPS bearer and one or more dedicated EPS bearer as shown in FIG. 4.

Figure 5A:
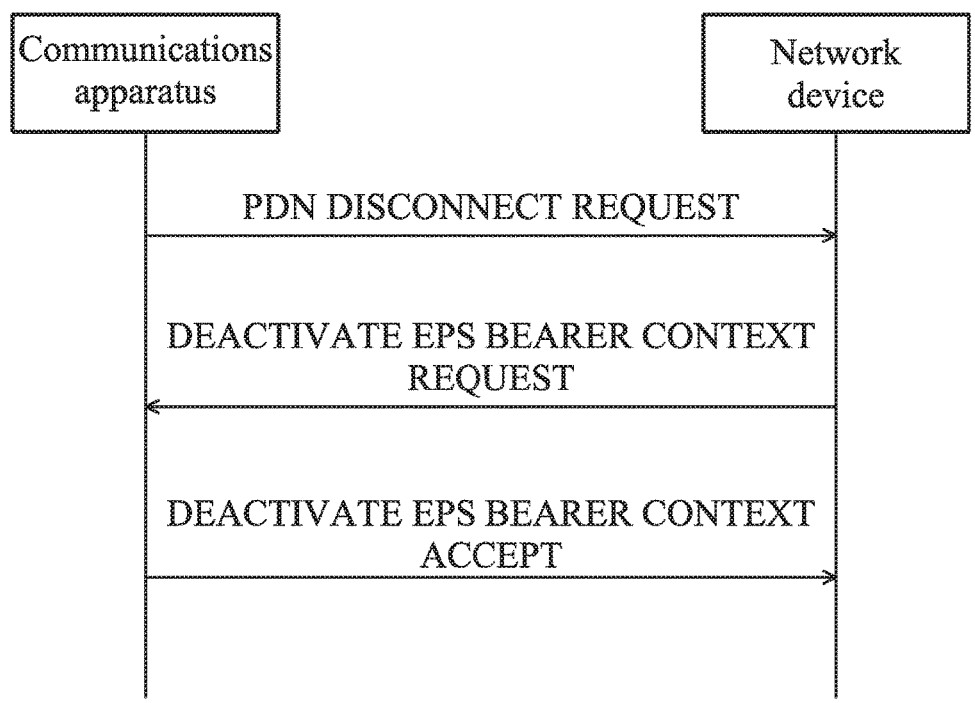
FIG. 5A is a message flow showing a PDN disconnect procedure when the network device accepts the PDN disconnect request.

The communications apparatus may also trigger a PDN disconnect procedure to disconnect (or, deactivate) a PDN connection. FIG. 5A is a message flow showing a PDN disconnect procedure. The communications apparatus transmits a PDN disconnect request message to the network device to disconnect (or, deactivate) a PDN connection. The network device transmits a deactivate EPS bearer context request message in response to the PDN disconnect request message. Upon receiving the deactivate EPS bearer context request message, the communications apparatus may transmit a deactivate EPS bearer context accept message to the network device to complete the PDN disconnect procedure.

Figure 5B:
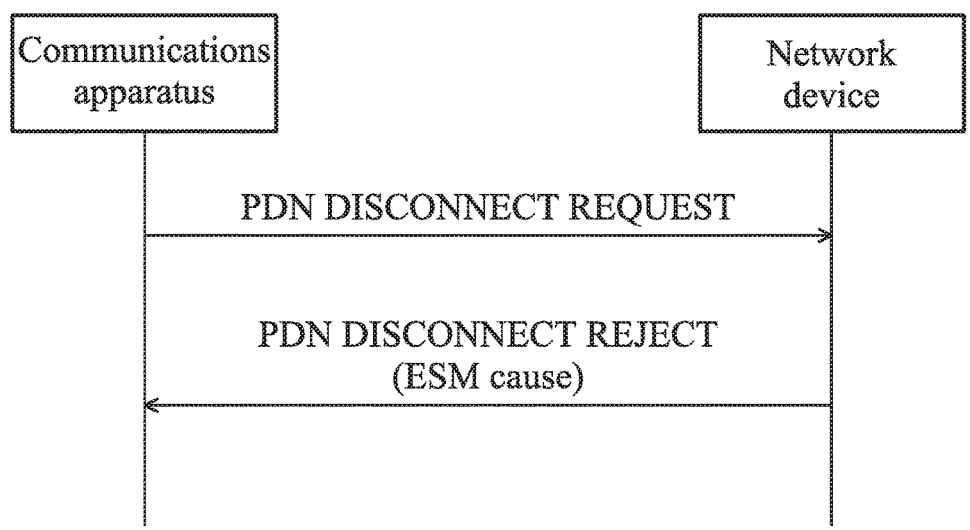
FIG. 5B is another message flow showing a PDN disconnect procedure when the network device rejects the PDN disconnect request.

FIG. 5B is another message flow showing a PDN disconnect procedure when the network device rejects the PDN disconnect request. When the network device rejects the PDN disconnect request, the network device transmits a PDN disconnect reject message with a reject cause carried therein, such as the ESM cause shown in FIG. 5.

According to an embodiment of the invention, the processor (e.g. the processor 222) may transmit a PDN disconnect request message to the network device via the radio transceiver 110 to request to disconnect a predetermined PDN connection. When the processor receives a PDN disconnect reject message from the network device as shown in FIG. 5B, the processor may further obtain a reject cause carried in the PDN disconnect reject message. When the reject cause carried in the PDN disconnect reject message indicates that the last PDN disconnection is not allowed, the processor may locally deactivate all other PDN connection(s) other than the predetermined PDN connection without explicit signaling to the network device, and keep the activation of the predetermined PDN connection since it is that PDN connection. For example, the processor may maintain an activated PDN record recording the activated PDN(s). When the processor performs local deactivation on a PDN connection, the processor may remove this PDN connection from the activated PDN record, so as to prevent the unsynchronized PDN status and unsynchronized EPS bearer status between the communications apparatus and the network device.

Note that when the number of activated PDNs maintained by the network device is unsynchronized with that maintained by the communications apparatus, the processor may not be aware of that the predetermined PDN disconnect that the communications apparatus requests to disconnect is the last PDN disconnection. The PDN or EPS bearer status unsynchronization may occur when the communications apparatus idles for a long time and the network device locally deactivates some PDN connections without notifying the communications apparatus. In this manner, the processor may locally deactivate all other PDN connection(s) other than the predetermined PDN connection so as to synchronize the PDN status with the network device.

In addition, according to an embodiment of the invention, the processor may locally deactivate all EPS bearer contexts associated with those other PDN connection(s). For example, the processor may maintain an EPS bearer record for one PDN connection to record the EPS bearer(s) associated with that PDN connection. When the processor performs local deactivation on the EPS bearer(s) for a PDN connection, the processor may remove the EPS bearer(s) from the EPS bearer record corresponding to that PDN connection.

Figure 6:
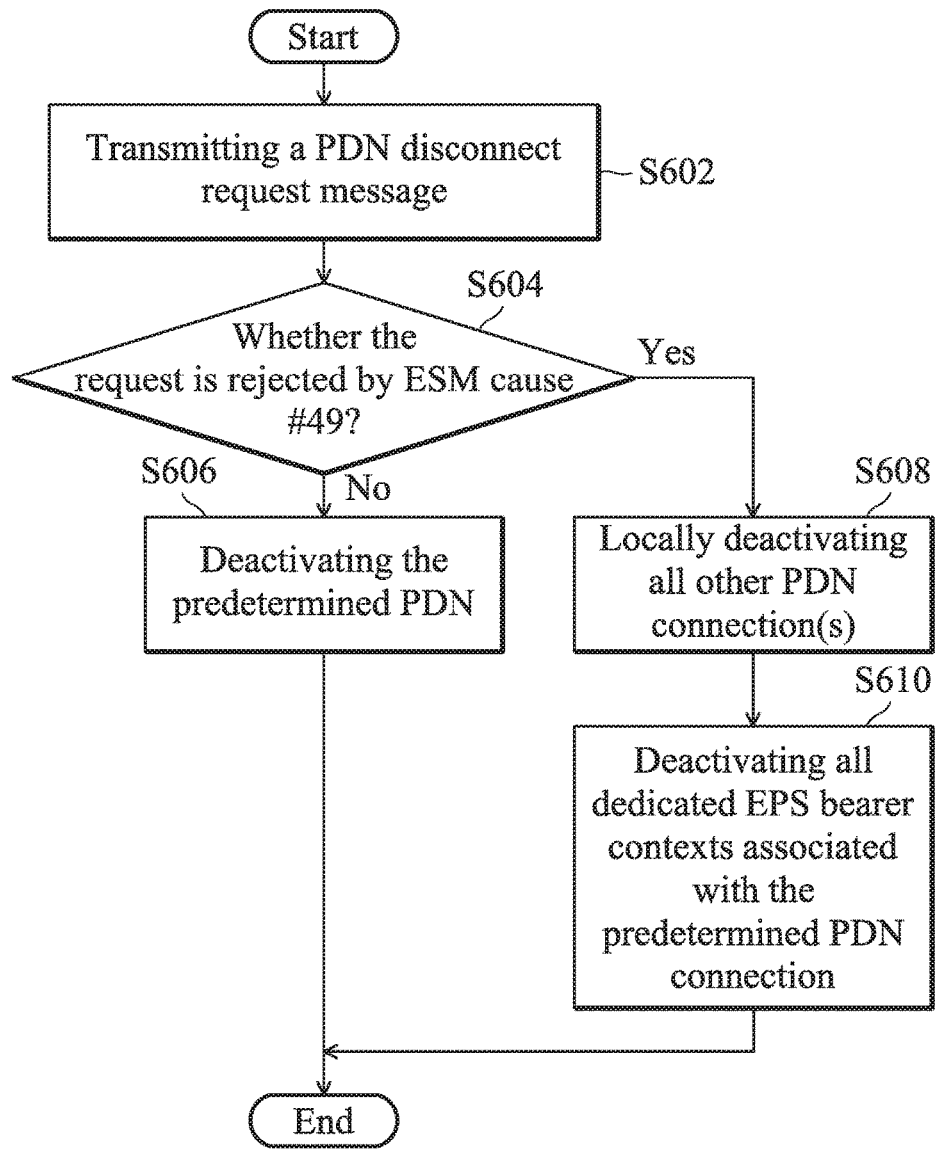
FIG. 6 is a flow chart showing the method for handling a PDN disconnection request according to an embodiment of the invention.

FIG. 6 is a flow chart showing the method for handling a PDN disconnection request according to an embodiment of the invention. The processor (e.g. the processor 222) may transmit a PDN disconnect request message to the network device to request to disconnect a predetermined PDN connection (Step S602). The processor may further determine whether the request is rejected and the reject cause carried in the PDN disconnect reject message is the ESM cause #49: "last PDN disconnection not allowed" (Step S604). If not, the processor may deactivate the predetermined PDN successfully (Step S606). If so, the processor may locally deactivate all other PDN connection(s) other than the predetermined PDN connection since the predetermined PDN connection is the last PDN connection (Step S608). The processor may locally deactivate all EPS bearer contexts associated with those other PDN connection(s). In an embodiment of the invention, the flow chart may be ended after step S606 or S608 is performed.

Figure 7:
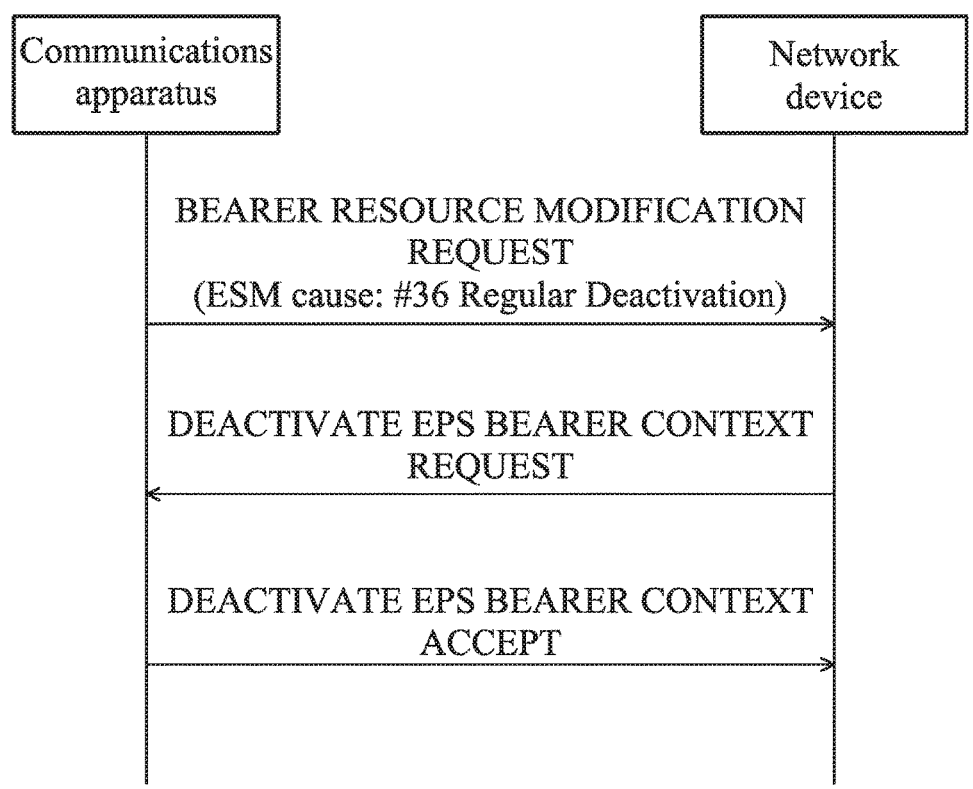
FIG. 7 is a message flow showing a bearer resource modification procedure for deactivating a dedicated EPS bearer.

In another embodiment of the invention, the processor may further perform one more step to deactivate all dedicated EPS bearer contexts associated with the predetermined PDN connection (Step S610). When the PDN disconnection request is triggered by an user of the communications apparatus, the processor may transmit one or more Bearer Resource Modification Request messages with ESM cause #36 "Regular Deactivation" carried along to network devices as shown in FIG. 7 to deactivate all dedicated EPS bearer contexts associated with the predetermined PDN connection to stop the data transfer on the dedicated EPS bearer and provide a better user experience. For example, when the user would like to stop or disable the LTE communications services, turn off the mobile communications function, etc., the user may operate on the user interface (UI) of the communications apparatus to disable or turn off the corresponding function, and thereby the processor may receive a disconnection request corresponding to that UI operation. In this manner, the processor may further deactivate all dedicated EPS bearer contexts associated with the predetermined PDN connection to stop the data transfer on the dedicated EPS bearer to avoid additional fee charging so as to provide a better user experience. Note that the processor may still keep the activation of the default EPS bearer context associated with the predetermined PDN connection.

FIG. 7 is a message flow showing a bearer resource modification procedure for deactivating a dedicated EPS bearer. The communications apparatus may transmit a bearer resource modification request message with an ESM cause #36 (Regular deactivation) to the network device. The network device may transmit a deactivate EPS bearer context request message to the communications apparatus in response to the bearer resource modification request message. Upon receiving the deactivate EPS bearer context request message, the communications apparatus may transmit a deactivate EPS bearer context accept message to the network device to complete the bearer resource modification procedure.

According to another aspect of the invention, instead of locally deactivating all other PDN connection(s), the processor may alternatively reactivate (or, recover) some or all other PDN connection(s) which is/are maintained locally by the communications device and may be regarded as lost PDN connection(s).

Figure 8:
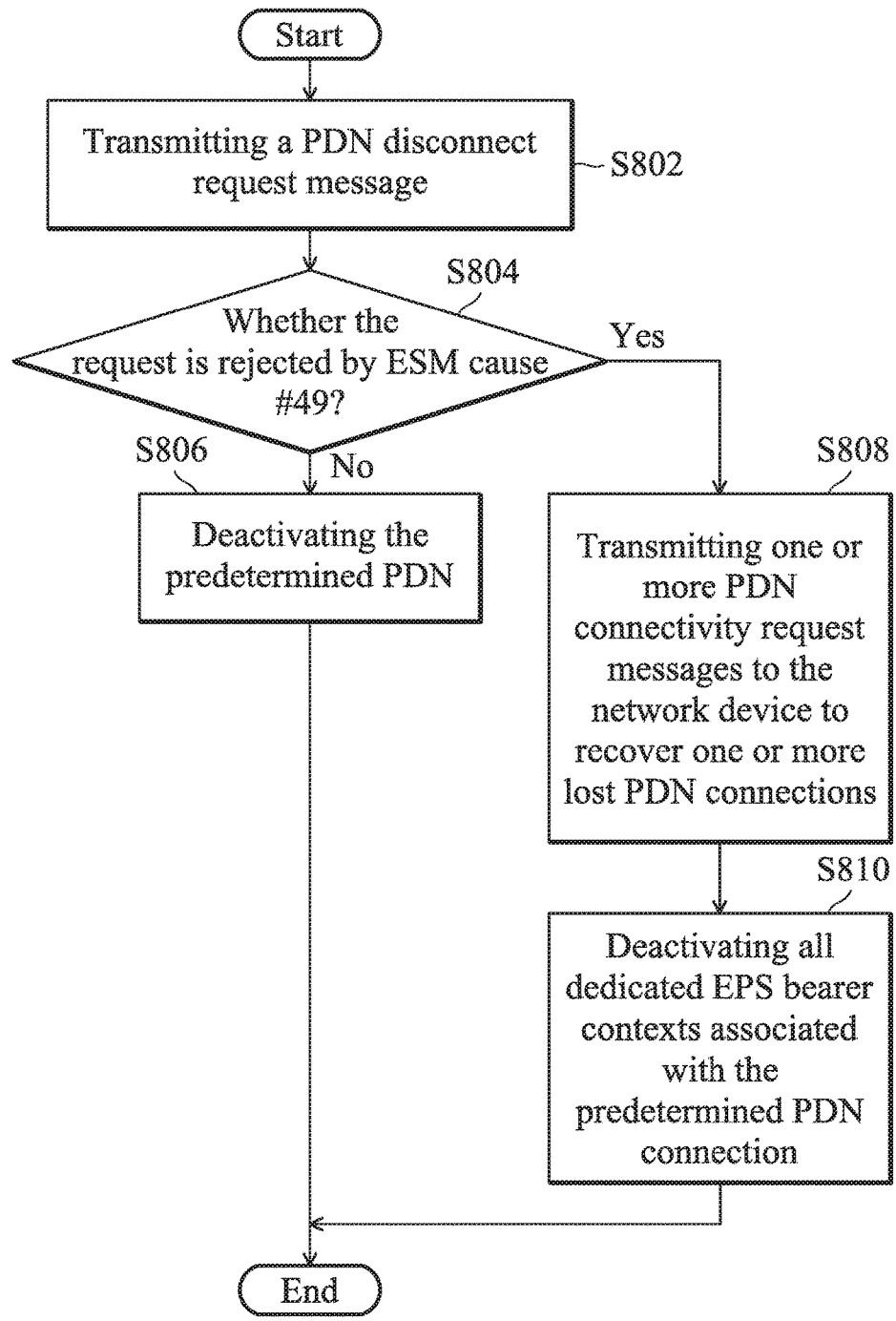
FIG. 8 is a flow chart showing the method for handling a PDN disconnection request according to another embodiment of the invention.

FIG. 8 is a flow chart showing the method for handling a PDN disconnection request according to another embodiment of the invention. Most steps shown in FIG. 8 are the same as those in FIG. 6, and only Step S808 is different. Therefore, those seeking a description of steps S802~S806 and S810 may refer to the descriptions of steps S602~S606 and S610, and the former are omitted here for brevity. In this embodiment, when a reject cause carried in the PDN disconnect reject message is ESM cause #49 (the yes path from Step S804), the processor may transmit one or more PDN connectivity request messages to the network device to recover lost PDN connection(s) which was/were maintained previously between the processor and the network device, other than the predetermined PDN connection (Step S808).

As discussed above, when the number of activated PDNs maintained by the network device is asynchronous with that maintained by the communications apparatus, the processor may not be aware that the predetermined PDN connection that the communications apparatus requests to disconnect is the last PDN disconnection. Therefore, in step S808, the processor may recover some or all lost PDN connection(s) other than the predetermined PDN connection via the procedure shown in FIG. 3B, for reactivating the PDN connection which is maintained locally by the processor, so as to restore the service back for the user.

In addition, the processor may further perform one more step to deactivate all dedicated EPS bearer contexts associated with the predetermined PDN connection (Step S810), and keep the activation of the default EPS bearer context associated with the predetermined PDN connection.

According to yet another aspect of the invention, when the processor receives a disconnection request triggered by the user from the UI, the processor may first determine whether the PDN connection requested to be disconnected is the last PDN connection. According to an embodiment of the invention, when the PDN connection requested to be disconnected is the last PDN connection, the processor may determine to ignore the disconnection request and does not transmit a PDN disconnect request message to the network device in response to the disconnection request.

Figure 9:
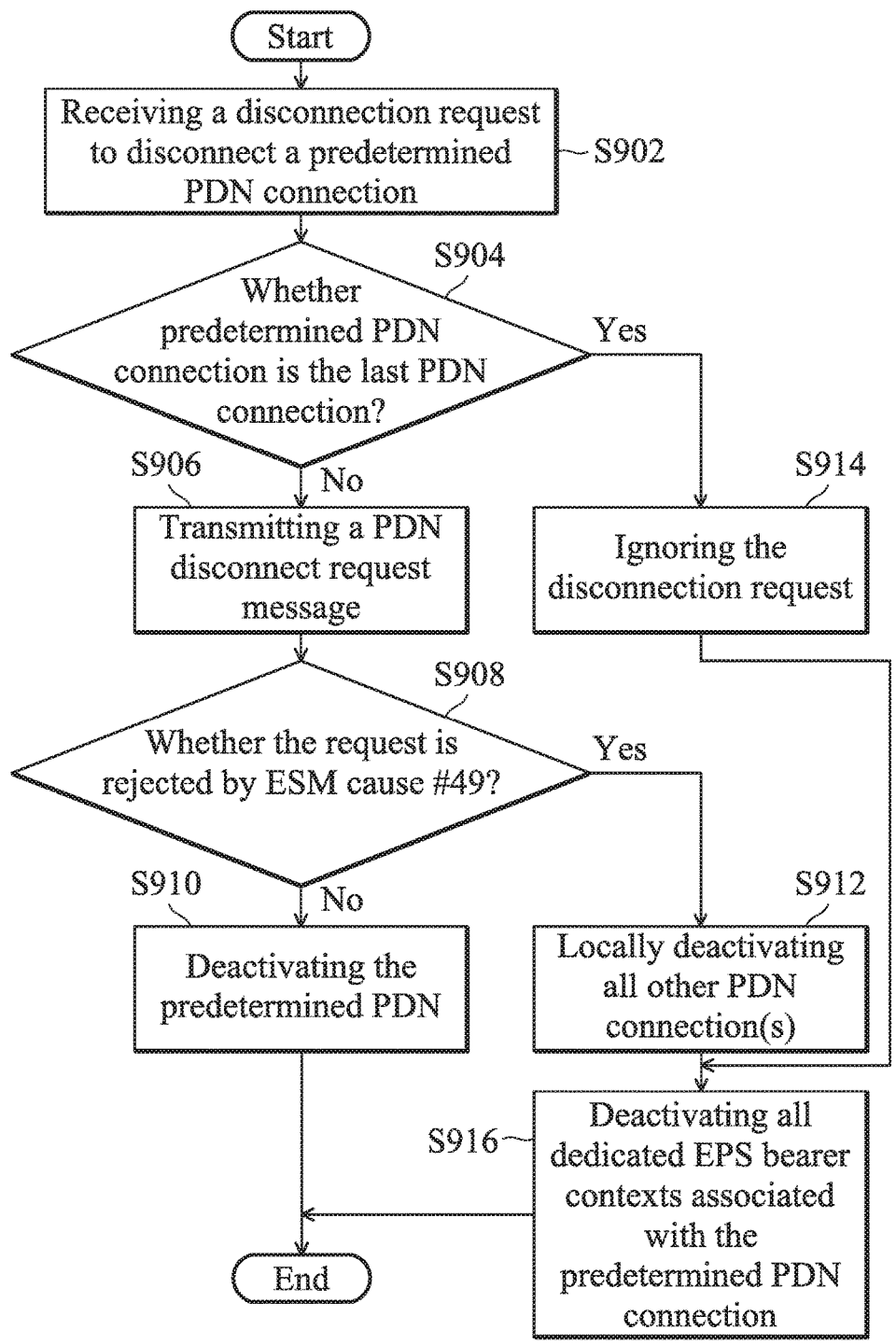
FIG. 9 is a flow chart showing the method for handling a PDN disconnection request according to yet another embodiment of the invention.

FIG. 9 is a flow chart of a method for handling a PDN disconnection request according to yet another embodiment of the invention. The processor (e.g. the processor 222) may receive a disconnection request to disconnect a predetermined PDN connection (Step S902). In some embodiments, the disconnection request may be triggered by the user as discussed above when the user would like to stop or disable the LTE communications service.

Upon receiving the disconnection request, the processor may determine whether the predetermined PDN connection is the last PDN connection (Step S904). If not, the processor may transmit a PDN disconnect request message to the network device to request to disconnect a predetermined PDN connection (Step S906). Next, the processor may further determine whether the request is rejected and the reject cause carried in the PDN disconnect reject message is the ESM cause #49: "last PDN disconnection not allowed" (Step S908). If not, the processor may deactivate the predetermined PDN successfully (Step S910). If so, the processor may locally deactivate all other PDN connection(s) other than the predetermined PDN connection since the predetermined PDN connection is the last PDN connection (Step S912). The processor may locally deactivate all EPS bearer contexts associated with those other PDN connection(s).

On the other hand, when the predetermined PDN connection is the last PDN connection, the processor may determine to ignore the disconnection request (Step S914) and does not transmit a PDN disconnect request message to the network device in response to the disconnection request.

From another point of view, the processor rejects the disconnection request triggered by the user.

After the processor locally deactivates all other PDN connection(s) in Step S912 or determines to ignore the disconnection request in Step S914, the processor may perform one more step to deactivate all dedicated EPS bearer contexts associated with the predetermined PDN connection (Step S916).

Note that in another embodiment of the invention, Step S912 may also be replaced by Step S808, transmitting one or more PDN connectivity request messages to the network device to recover the lost PDN connections other than the predetermined PDN connection for reactivating the PDN connection(s), which is/are maintained locally by the communications apparatus.

According to an embodiment of the invention, the network card (e.g. the network card 224) may maintain some records for storing one or more parameters, such as a PDN ID, DNS, etc. associated with each PDN for binding that PDN to the network card. When the processor determines to ignore the disconnection request, the processor may further remove one or more parameters associated with the predetermined PDN connection from the record maintained by a network card of the communications device to unbind the predetermined PDN connection from the network card.

In this manner, the communications apparatus may stay in the LTE network without fallback to a legacy network, such as the 2G or 3G network. At anytime later when the user would like to use the predetermined PDN connection again, the processor may bind this PDN to the network card directly, without additional effort to reactivate this PDN connection. That is, the PDN connection can be reused directly without the need to reactivate the PDN via the PDN connectivity procedure shown in FIG. 3B.

According to yet another aspect of the invention, when the processor receives a disconnection request triggered by the user from the UI and the predetermined PDN connection requested to be disconnected is the last PDN connection, the processor may determine to transmit a PDN disconnect request message to the network device and let the network device control the following procedure. For example, the network device may accept the PDN disconnect request message, reject the PDN disconnect request message, initiate a detach procedure, or others. In this manner, the PDN status can be synchronized between the communications apparatus and the network device via the explicit signaling.

In an embodiment of the invention, when the network device accepts the PDN disconnect request message, the processor may deactivate the predetermined PDN successfully as shown in Step S606 or S806. When the network device rejects the PDN disconnect request message and the reject cause carried in the PDN disconnect reject message is the ESM cause #49, and the processor may perform the steps following Step S608 or S808 as shown in FIG. 6 or FIG. 8.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a radio transceiver, transmitting or receiving wireless radio frequency signals to communicate with a network device; and
   a processor, transmitting a PDN disconnect request message to the network device via the radio transceiver to request to disconnect a predetermined PDN connection, receiving a PDN disconnect reject message from the network device via the radio transceiver and obtaining a reject cause carried in the PDN disconnect reject message,
   wherein when the reject cause carried in the PDN disconnect reject message indicates that the last PDN disconnection is not allowed, the processor locally deactivates all other PDN connection(s) other than the predetermined PDN connection, and
   wherein the communications apparatus is a User Equipment.

2. The communications apparatus as claimed in claim 1, wherein the processor locally deactivates all EPS bearer contexts associated with those other PDN connection(s).

3. The communications apparatus as claimed in claim 1, wherein the processor further deactivates all dedicated EPS bearer contexts associated with the predetermined PDN connection.

4. A method for handling a PDN disconnection request, performed by a communications device communicating with a network device, wherein the communications device is a User Equipment comprising a processor, and the method comprises:
   transmitting, by the processor of the UE, a PDN disconnect request message to the network device to request to disconnect a predetermined PDN connection;
   receiving, by the processor of the UE, a PDN disconnect reject message from the network device;
   obtaining, by the processor of the UE, a reject cause carried in the PDN disconnect reject message; and
   locally deactivating, by the processor of the UE, all other PDN connection(s) other than the predetermined PDN connection when the reject cause carried in the PDN disconnect reject message indicates that the last PDN disconnection is not allowed.

5. The method as claimed in claim 4, further comprising:
   locally deactivating all EPS bearer contexts associated with those other PDN connection(s).

6. The method as claimed in claim 4, further comprising:
   deactivating all dedicated EPS bearer contexts associated with the predetermined PDN connection.

7. A communications apparatus, comprising:
   a radio transceiver, transmitting or receiving wireless radio frequency signals to communicate with a network device; and
   a processor, receiving a disconnection request to disconnect a predetermined PDN connection and determining whether the predetermined PDN connection is the last PDN connection,
   wherein when the predetermined PDN connection is the last PDN connection, the processor ignores the disconnection request and does not transmit a PDN disconnect request message to the network device in response to the disconnection request;

wherein the communication apparatus further comprises: a network card, wherein the processor further removes one or more parameters associated with the predetermined PDN connection from a record maintained by the network card so as to unbind the predetermined PDN connection from the network card.

8. The communications apparatus as claimed in claim 7, wherein the processor further deactivates all dedicated EPS bearer contexts associated with the predetermined PDN connection.

9. A method for handling a PDN disconnection request, performed by a communications device communicating with a network device, comprising:

receiving a disconnection request to disconnect a predetermined PDN connection;

determining whether the predetermined PDN connection is the last PDN connection; and ignoring the disconnection request and not transmitting a PDN disconnect request message to the network device in response to the disconnection request when the predetermined PDN connection is the last PDN connection;

wherein the method further comprises:

removing one or more parameters associated with the predetermined PDN connection from a record maintained by a network card of the communications device to unbind the predetermined PDN connection from the network card.

10. The method as claimed in claim 9, further comprising: deactivating all dedicated EPS bearer contexts associated with the predetermined PDN connection.

11. A communications apparatus, comprising:

a radio transceiver, transmitting or receiving wireless radio frequency signals to communicate with a network device; and a processor, transmitting a PDN disconnect request message to the network device via the radio transceiver to request to disconnect a predetermined PDN connection, receiving a PDN disconnect reject message from the network device via the radio transceiver and obtaining a reject cause carried in the PDN disconnect reject message, wherein when the reject cause carried in the PDN disconnect reject message indicates that the last PDN disconnection is not allowed, the processor transmits one or more PDN connectivity request message(s) to the network device to recover one or more lost PDN connection(s) which is/are maintained locally by the processor other than the predetermined PDN connection; and wherein the communications apparatus is a User Equipment.

12. The communications apparatus as claimed in claim 11, wherein the processor further deactivates all dedicated EPS bearer contexts associated with the predetermined PDN connection.

13. A method for handling a PDN disconnection request, performed by a communications device communicating with a network device, wherein the communications device is a User Equipment comprising a processor, and the method comprises:

transmitting, by the processor of the UE, a PDN disconnect request message to the network device to request to disconnect a predetermined PDN connection;

receiving, by the processor of the UE, a PDN disconnect reject message from the network device;

obtaining, by the processor of the UE, a reject cause carried in the PDN disconnect reject message which indicates that the last PDN disconnection is not allowed; and transmitting, by the processor of the UE, one or more PDN connectivity request message(s) to the network device to recover one or more lost PDN connection(s) which is/are maintained locally by the communications device other than the predetermined PDN connection.

14. The method as claimed in claim 13, further comprising:

deactivating all dedicated EPS bearer contexts associated with the predetermined PDN connection.

15. A communications apparatus, comprising:

a radio transceiver, transmitting or receiving wireless radio frequency signals to communicate with a network device; and a processor, receiving a disconnection request to disconnect a predetermined PDN connection, wherein when the predetermined PDN connection is the last PDN connection, the processor transmits a PDN disconnect request message to the network device via the radio transceiver in response to the disconnection request to request to disconnect the predetermined PDN connection;

wherein the communication apparatus further comprises: a network card, wherein the processor further removes one or more parameters associated with the predetermined PDN connection from a record maintained by the network card so as to unbind the predetermined PDN connection from the network card.

16. The communications apparatus as claimed in claim 15, wherein when the processor receives a PDN disconnect reject message from the network device and a reject cause carried in the PDN disconnect reject message indicates that the last PDN disconnection is not allowed, the processor further deactivates all dedicated EPS bearer contexts associated with the predetermined PDN connection.

17. A method for handling a PDN disconnection request, performed by a communications device communicating with a network device, comprising:

receiving a disconnection request to disconnect a predetermined PDN connection;

determining whether the predetermined PDN connection is the last PDN connection; and transmitting a PDN disconnect request message to the network device in response to the disconnection request to request to disconnect the predetermined PDN connection when the predetermined PDN connection is the last PDN connection;

wherein the method further comprises:

removing one or more parameters associated with the predetermined PDN connection from a record maintained by a network card of the communications device to unbind the predetermined PDN connection from the network card.

18. The method as claimed in claim 17, further comprising:
- receiving a PDN disconnect reject message with a reject cause carried in the PDN disconnect reject message indicating that the last PDN disconnection is not allowed; and
- deactivating all dedicated EPS bearer contexts associated with the predetermined PDN connection.

* * * * *